(12) United States Patent
Niass

(10) Patent No.: US 9,657,937 B2
(45) Date of Patent: May 23, 2017

(54) STEAM GENERATION SYSTEM HAVING MULTIPLE COMBUSTION CHAMBERS AND DRY FLUE GAS CLEANING

(75) Inventor: Tidjani Niass, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 303 days.

(21) Appl. No.: 12/861,328

(22) Filed: Aug. 23, 2010

(65) Prior Publication Data

US 2012/0042810 A1 Feb. 23, 2012

(51) Int. Cl.
| | |
|---|---|
| F23J 11/00 | (2006.01) |
| F23C 6/04 | (2006.01) |
| F23J 15/00 | (2006.01) |
| F23J 15/02 | (2006.01) |
| F23L 7/00 | (2006.01) |
| F22B 31/04 | (2006.01) |

(52) U.S. Cl.
CPC ............. *F23C 6/04* (2013.01); *F22B 31/04* (2013.01); *F23J 15/006* (2013.01); *F23J 15/02* (2013.01); *F23L 7/007* (2013.01); *F23C 2201/401* (2013.01); *F23J 2219/60* (2013.01); *Y02E 20/326* (2013.01); *Y02E 20/344* (2013.01)

(58) Field of Classification Search
CPC .................................................. B01D 53/1425
USPC ..................... 110/345, 229, 347, 203–217
See application file for complete search history.

(56) References Cited

U.S. PATENT DOCUMENTS

| | | | |
|---|---|---|---|
| 3,531,664 A * | 9/1970 | Hals ................................. 310/11 |
| 3,717,700 A * | 2/1973 | Robison et al. ......... 423/244.05 |
| 3,818,869 A * | 6/1974 | Blaskowski ....................... 122/5 |
| 4,202,169 A * | 5/1980 | Acheson et al. ............. 60/39.12 |
| 4,744,969 A * | 5/1988 | Marten et al. ............. 423/541.1 |
| 4,755,499 A * | 7/1988 | Neal et al. ...................... 502/415 |
| 4,809,621 A * | 3/1989 | Materna ......................... 110/323 |
| 4,913,068 A * | 4/1990 | Brannstrom .................. 110/342 |
| 4,931,073 A * | 6/1990 | Miller et al. .................... 95/280 |
| 5,023,063 A * | 6/1991 | Stiles .......................... 423/239.1 |
| 5,383,955 A * | 1/1995 | Neal et al. ........................ 95/34 |

(Continued)

FOREIGN PATENT DOCUMENTS

| | | | |
|---|---|---|---|
| DE | 3627834 A1 * | 2/1988 | ......... B01D 53/8625 |
| DE | 4019893 A1 | 3/1991 | |

(Continued)

OTHER PUBLICATIONS

PCT International Search Report and the Written Opinion of the EP International Searching Authority dated Jan. 30, 2014; International Application No. PCT/US2011/044656; International File Date: Jul. 20, 2011.

Primary Examiner — Jason Lau
(74) Attorney, Agent, or Firm — Bracewell LLP; Constance G. Rhebergen; Brian H. Tompkins

(57) ABSTRACT

A method for producing steam while concurrently reducing emissions. The method includes combusting fuel and an oxidant stream having a high concentration of oxygen in a combustion zone having multiple combustion chambers and heat exchangers to produce a flue gas. The flue gas is subsequently cleaned in a dry flue gas cleaning chamber by contacting it with a dry adsorbent. In one embodiment, the method advantageously regenerates the dry adsorbent so that the dry adsorbent can be subsequently recycled back into the dry gas flue chamber.

5 Claims, 1 Drawing Sheet

(56) References Cited

U.S. PATENT DOCUMENTS

| | | | |
|---|---|---|---|
| 5,450,821 A * | 9/1995 | Kalina | F01K 3/24 |
| | | | 122/1 R |
| 5,535,687 A * | 7/1996 | Khanna | 110/345 |
| 6,289,851 B1 * | 9/2001 | Rabovitser et al. | 122/95.2 |
| 6,408,612 B2 * | 6/2002 | Hannemann et al. | 60/39.12 |
| 6,521,365 B1 * | 2/2003 | Song | 429/411 |
| 6,952,997 B2 * | 10/2005 | Shimrony et al. | 110/345 |
| 6,971,336 B1 | 12/2005 | Chojnacki et al. | |
| 7,320,288 B2 * | 1/2008 | Marin et al. | 110/345 |
| 7,416,716 B2 | 8/2008 | Allam et al. | |
| 2004/0247509 A1 * | 12/2004 | Newby | 423/240 S |
| 2005/0120924 A1 * | 6/2005 | Chandran et al. | 110/203 |
| 2005/0155934 A1 * | 7/2005 | Vo et al. | 210/670 |
| 2006/0288919 A1 | 12/2006 | Rameshni | |
| 2007/0012231 A1 * | 1/2007 | Smith et al. | 110/233 |
| 2007/0243119 A1 | 10/2007 | Downs et al. | |
| 2008/0153042 A1 | 6/2008 | Laux et al. | |
| 2008/0209807 A1 * | 9/2008 | Tsangaris et al. | 48/89 |
| 2008/0307960 A1 * | 12/2008 | Hendrickson et al. | 95/28 |
| 2009/0025390 A1 * | 1/2009 | Christensen et al. | 60/670 |
| 2009/0205364 A1 * | 8/2009 | Enis et al. | 62/604 |

FOREIGN PATENT DOCUMENTS

| | | |
|---|---|---|
| EP | 0645581 A2 | 3/1995 |
| FR | 2850733 A1 | 8/2004 |
| JP | 10009538 A | 1/1998 |
| WO | 2009010691 A2 | 1/2009 |

* cited by examiner

STEAM GENERATION SYSTEM HAVING MULTIPLE COMBUSTION CHAMBERS AND DRY FLUE GAS CLEANING

TECHNICAL FIELD OF THE INVENTION

The present invention relates to a method and system for improved emissions from a steam generation system having an integrated dry flue gas cleaning unit. More specifically, the present invention provides for a method and system for steam generation that employs the use of multi-combustion oxy-boiler chambers having advanced temperature control systems for helping to reduce $NO_x$ emissions.

BACKGROUND OF THE INVENTION

Steam generation through the combustion of fuels that contain nitrogen and sulfur lead to pollutants emissions such as nitrogen oxides ($NO_x$) and sulfur oxides ($SO_x$) to the atmosphere. $NO_x$ and $SO_x$ emissions to the atmosphere are known of having a negative impact on the environment. For example, $NO_x$ and SOx are responsible for acid rains and ozone depletion that affect the environment by reducing air quality and killing vegetation. They can also be responsible for serious troubles in human health in case of long exposure to these pollutants.

Due to their negative impacts as mentioned above, governments around the world monitor and control pollutant emissions, and impose restrictions for maximum levels of atmospheric emissions based on combustion plant size and type. Several processes are available for handling $NO_x$ and $SO_x$ removal from flue gases. These processes include precipitators to remove the dust and ash, catalytic or non-catalytic reactors to remove the $NO_x$ and dry or wet scrubbers to remove the $SO_x$. This association of several technologies in order to remove the pollutants is usually very expensive in term of capital and operating costs since most of these technologies produce a by-product as a result of the flue gas cleaning. One way of reducing the cost of pollutant removal, is to integrate the flue gas cleaning into the boiler and reduce the amount of by-products produced by the flue gas treatment unit.

Climate change is another issue that is getting more attention, with particular focus on greenhouse gas emissions, since they are seen as the main culprit. Generally, the combustion of fossil fuels such as oil, coal or natural gas produces carbon dioxide ($CO_2$), thereby adding to the greenhouse gas effect. Several technologies are under development to mitigate $CO_2$ emissions. Among these technologies, CCS ($CO_2$ Capture and Sequestration) is foreseen as one of the most efficient solutions to reduce $CO_2$ emissions to the atmosphere. Oxy-combustion technology is part of $CO_2$ capture technologies and is considered as one of the most economical route to capture $CO_2$ for sequestration or Enhanced Oil Recovery (EOR).

Oxy-combustion technology uses oxygen (generally streams composed of more than 75% oxygen) instead of air to combust the fuel and produce a highly concentrated $CO_2$ stream that is easier to capture in comparison to the conventional amine scrubbing technology. This can be achieved by removing nitrogen from air and consequently producing flue gas flow rate that is four to five times lower than conventional air combustion flue gas. In oxy-combustion, since the flue gas flow rate is very low, the concentration of $SO_x$ is high allowing for improved removal due to the higher $SO_x$ gradient. This can simplify the flue gas desulfurization unit and drastically reduce its cost. In addition, the removal of nitrogen from air suppresses the thermal $NO_x$ that are formed by the oxidation of nitrogen in air-combustion systems.

The removal of nitrogen from air will also increase the temperature of the flue gas in the combustion chamber, which drastically impacts the heat transfer. For example, in a conventional air-boiler where about 35% of the energy released in the combustion chamber is used to vaporize the water circulating in the walls, the flue gas temperature is about 1300° C. whereas the flue gas temperature in an oxy-boiler with the same energy extraction is about 3650° C. Obviously this temperature is not compatible with conventional materials used for designing boilers. To avoid this high level temperature, it is usually suggested to recycle part of the flue gas exiting the boiler to the combustion chamber in order to reduce the flue gas temperature to acceptable temperatures. This solution is useful, but has the main drawback of reducing the thermal efficient of the oxy-boiler since the recycled flue gas act only as temperature moderator.

It would be desirable to have an improved process for generating steam from the combustion of a sulfur-containing fuel with oxygen, while minimizing equipment size and reducing $SO_x$ and $NO_x$ emissions. It would be advantageous to regenerate the adsorbent used to remove sulfur products in order to recycle the adsorbent back into the system.

SUMMARY OF THE INVENTION

The present invention is directed to a method and system that satisfies at least one of these needs. The present invention includes a method and system for generating steam while reducing emissions.

In one embodiment, the method for steam generation includes providing an oxidant enriched gas stream having an oxygen content of 21 to 100% by volume, preferably 75% to 100% by volume, combusting at least a portion of a fuel stream that can contain sulfur and/or nitrogen, which can be oil heavy residue and/or fuel gas, in the presence of the oxidant enriched gas stream in a combustion zone to produce a flue gas and heat, wherein the combustion zone is comprised of at least two combustion chambers, wherein each combustion chamber has an internal temperature gradient; and regulating said internal temperature gradients of each combustion chamber using one or several heat exchangers that are preferably positioned in the walls of the combustions chambers such that the flue gas temperature at the exit of the combustion chambers are within a predetermined temperature range of 800 to 1400° Celsius, wherein said heat exchangers employ the use of water (in the form of liquid water and/or steam), wherein the enthalpy of the water is increased through heat exchange with the flue gases from the combustion chambers. The flue gas can be introduced into a flue gas cleaning chamber to produce a third product stream comprised of spent adsorbent and desulfurized flue gas, wherein the desulfurized flue gas has reduced amounts of sulfur oxides ("$SO_x$") as compared to the flue gas entering said flue gas cleaning chamber, the flue gas cleaning chamber having an amount of adsorbent contained therein that is operable to remove at least a portion of $SO_x$ from the flue gas entering said flue gas cleaning chamber. In one embodiment, the internal temperature gradients are regulated without recycling any portion of the flue gas or the desulfurized flue gas into the combustion zone.

In another embodiment, the combustion chambers can be configured in series or in parallel, with each combustion chamber being separated from another combustion chamber by at least one of the heat exchangers.

In another embodiment, the method for steam generation includes providing an oxidant enriched gas stream having an oxygen content of 21 to 100% by volume and combusting a portion of a fuel stream in the presence of the oxidant enriched gas stream in a first combustion chamber to generate a first product stream, the first product stream comprising flue gas and non-combusted fuel, the fuel stream comprising a fuel source having sulfur. One or several heat exchangers can be used to remove heat from the first product stream such that the temperature of the first product stream remains within a range of 800 to 1400° Celsius as it is being introduced to a second combustion chamber and further combusting the non-combusted fuel to produce a second product stream, the second product stream having a greater amount of flue gas as compared to the first product stream. Similarly, one or several heat exchangers can be used to remove heat from the second product stream such that the temperature of the second product stream remains within a range of 800 to 1400° Celsius as it is being introduced into a flue gas cleaning chamber to produce a third product stream comprised of spent adsorbent and desulfurized flue gas, wherein the desulfurized flue gas has reduced amounts of $SO_x$ as compared to the flue gas within the second product stream, the flue gas cleaning chamber having an amount of adsorbent contained therein that is operable to remove at least a portion of $SO_x$ from the second product stream. The third product stream is then introduced into a first precipitator and the third product stream can be separated into a spent adsorbent stream and a cleaned flue gas stream, with the cleaned flue gas stream being preferably sent to a $CO_2$ recovery unit. In another embodiment, the cleaned flue gas stream can be released to the atmosphere. Concurrently, water is heated to increase the enthalpy of the water. Preferably, the water absorbs the heat produced from the combustion chambers as the water turns into steam or superheated steam, depending upon the initial conditions of the water (e.g. liquid or gaseous).

In one embodiment of the present invention, the adsorbent is a solid having particle sizes in the range of 50 to 500 microns. Preferred solid adsorbents include calcium oxide ("CaO") and/or magnesium oxide ("MgO"). In one embodiment, the first and second combustion chambers have water circulating within walls of each chamber for regulating the temperature within each combustion chamber. Preferably, the walls include membrane tubes and welded fins connecting the membrane tubes. In one embodiment, the temperature within each chamber is within a range of about 800° C. to about 2500° C.; preferably 1000° C. to about 1400° C. In one embodiment, a reducing agent can be introduced into the flue gas cleaning chamber in order to reduce the $NO_x$ concentration of the third product stream as compared to the second product stream. Preferred reducing agents include ammonia, urea, and combinations thereof. Additionally, it is preferred that the reducing agent be dispersed homogeneously throughout the flue gas cleaning chamber.

In another embodiment, the cleaned flue gas stream can be introduced into a second precipitator to remove additional amounts of adsorbent prior to sending the cleaned flue gas stream to the $CO_2$ recovery unit or to the atmosphere. In a preferred embodiment, the first precipitator can be a cyclone, and the second precipitator can be selected from the group consisting of an electrostatic precipitator type, a fabric filter bag type, and combinations thereof. In another embodiment, the method can include comprising introducing the cleaned flue gas stream into a heat exchanger to transfer heat energy from the flue gas stream to a target fluid prior to sending the cleaned flue gas stream to the $CO_2$ recovery unit or to the atmosphere, wherein the target fluid is selected from the group consisting of saturated steam and water.

In yet another embodiment of the present invention, the method can further include introducing the spent adsorbent stream into a regeneration unit; contacting the spent adsorbent stream with a reducing gas to produce regenerated adsorbent and spent reducing gas; introducing the spent reducing gas to a sulfur recovery unit; and recycling the regenerated adsorbent to the flue gas cleaning chamber.

The system for generating steam include an oxidant delivery system, a first and second combustion chamber, a first and second heat exchanger, a flue gas cleaning chamber, a precipitating unit, an adsorbent storage tank, a discharge line, a reducing gas feed line, a regeneration unit, and a sulfur discharge line. The oxidant delivery system can be for providing an oxidant enriched gas stream having an oxygen content of 21 to 100% by volume. Preferred oxidant delivery systems include air separation processes having cryogenic separation of air, pressure swing air separation and temperature swing air separation units. The first combustion chamber is preferably in fluid communication with the oxidant delivery system, such that the first combustion chamber is operable to combust a portion of a fuel stream in the presence of the oxidant enriched gas stream to generate a first product stream comprised of flue gas and non-combusted fuel. The first heat exchanger is preferably in fluid communication with the first combustion chamber, such that the first heat exchanger is operable to remove heat from the first product stream such that the temperature of the first product stream is maintained within a desired range.

The second combustion chamber is preferably in fluid communication with the first heat exchanger, such that the second combustion chamber is operable to combust a portion of the non-combusted fuel of the first product stream to produce a second product stream, wherein the second product stream has a greater amount of flue gas as compared to the first product stream. The second heat exchanger is preferably in fluid communication with the second combustion chamber, such that the second heat exchanger is operable to remove heat from the second product stream such that the temperature of the second product stream is maintained within a desired range. The flue gas cleaning chamber is preferably in fluid communication with the second heat exchanger, the flue gas cleaning chamber having an amount of adsorbent contained therein that is operable to remove at least a portion of $SO_x$ from the second product stream to produce a third product stream, the third product stream comprising a desulfurized flue gas and spent adsorbent, the desulfurized flue gas having reduced amounts of $SO_x$ as compared to the flue gas within the second product stream. The precipitating unit is preferably in fluid communication with the flue gas cleaning chamber for removing the spent adsorbent from the desulfurized flue gas to produce a spent adsorbent stream and a cleaned flue gas stream.

The adsorbent storage tank is preferably in fluid communication with the precipitating unit for receiving the spent adsorbent stream. The discharge line is preferably in fluid communication with the precipitating unit for sending the cleaned flue gas stream to a $CO_2$ recovery unit or to the atmosphere. The reducing gas feed line is preferably in fluid communication with the flue gas cleaning chamber for introducing reducing gas to the flue gas cleaning chamber. The regeneration unit is preferably in fluid communication with the adsorbent storage tank, the reducing gas feed line, and the flue gas cleaning chamber. The regeneration unit being operable to regenerate the spent adsorbent stream by contacting the spent adsorbent stream with a reducing gas to produce regenerated adsorbent and spent reducing gas, wherein the regenerated adsorbent is then recycled back to the flue gas cleaning chamber. The sulfur discharge line is preferably in fluid communication with the regeneration unit, wherein the sulfur discharge line can be operable to introduce the spent reducing gas to a sulfur recovery unit.

In one embodiment of the present invention, the adsorbent is a solid having particle sizes in the range of 50 to 500 microns. Preferred solid adsorbents include CaO and/or MgO. In one embodiment, the first and second combustion chambers have water circulating within walls of each chamber for regulating the temperature within each combustion chamber. Preferably, the walls include membrane tubes and welded fins connecting the membrane tubes. In one embodiment, the temperature within each chamber is within a range of about 800° C. to about 2500° C.; preferably 800° C. to about 1400° C. In one embodiment, a reducing agent can be introduced into the flue gas cleaning chamber in order to reduce the $NO_x$ concentration of the third product stream as compared to the second product stream. Preferred reducing agents include ammonia, urea, and combinations thereof. Additionally, it is preferred that the reducing agent be dispersed homogeneously throughout the flue gas cleaning chamber.

In another embodiment of the present invention, the precipitating unit includes a first precipitator that is operable to remove substantially all of the spent adsorbent from the desulfurized flue gas. In another embodiment, the system can further include a third heat exchanger in fluid communication with the precipitating unit and the discharge line, the third heat exchanger operable to transfer heat energy from the flue gas stream to a target fluid prior to sending the cleaned flue gas stream to the $CO_2$ recovery unit, wherein the target fluid is selected from the group consisting of saturated steam and liquid water.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
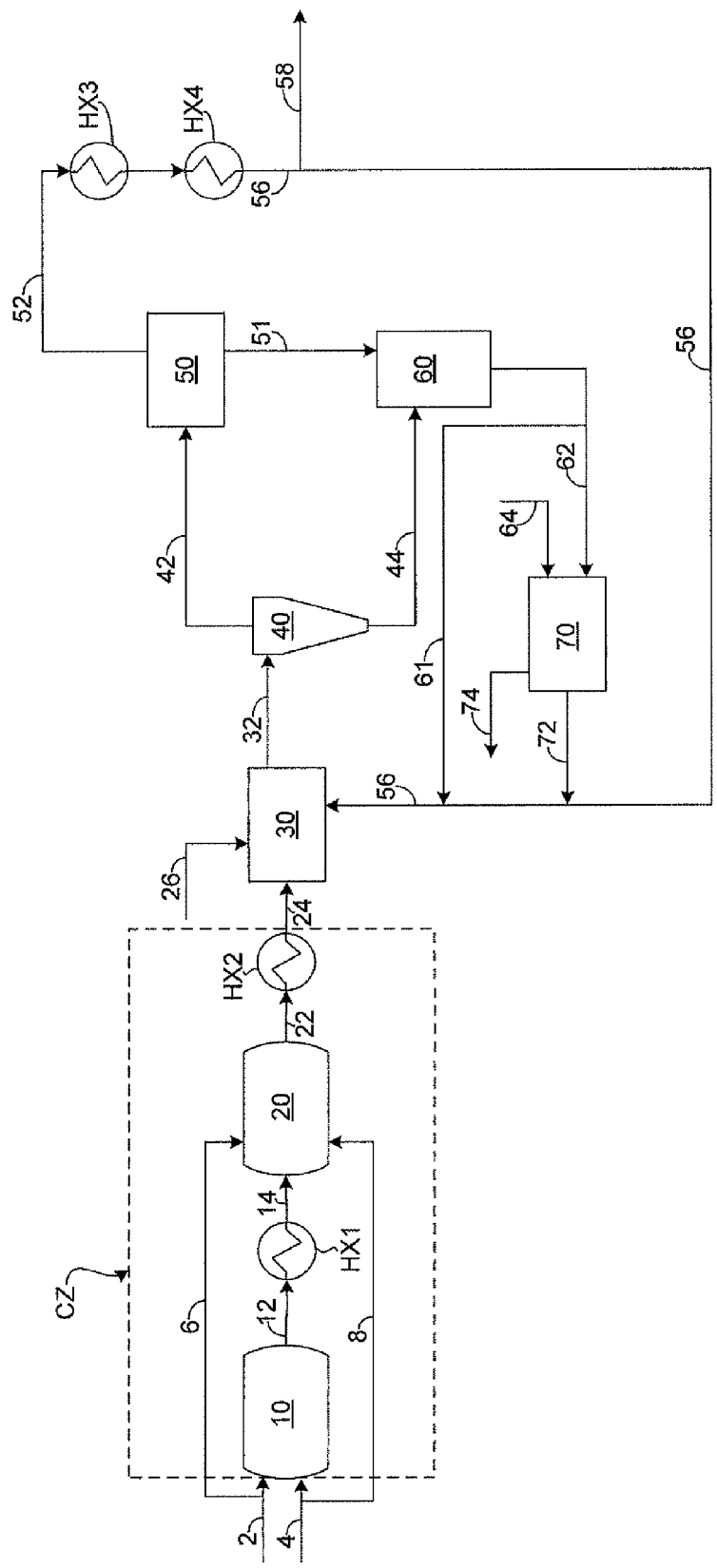
FIG. 1 is an embodiment of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In FIG. 1, fuel 2 and oxidant enriched gas stream 4 enter combustion zone CZ and are fed into first combustion chamber 10, wherein fuel 2 combusts to produce flue gas and heat. In one embodiment, oxidant enriched gas stream 4 has an oxygen content between 75% to 100% oxygen by volume. This increased level of oxygen content provides an increased level of desulfurization over lower levels of oxygen content. In a preferred embodiment, the heat is partially transferred to a mixture of liquid water and steam circulating within the walls of the first combustion chamber 10. Preferably, the walls of first combustion chamber 10 are of membrane type tubes having tubes connected by welded fins. The temperature within first combustion chamber 10 can be adjusted by controlling the flow rate of fuel 2 and oxidant enriched gas stream 4 entering first combustion chamber 10. In one embodiment, the temperature is maintained within a range from 800 to 2500 degrees Celsius. In another embodiment, the temperature is maintained within a range from 1000 to 1400 degrees Celsius, in order to help prevent $NO_x$ formation. The flue gas, which in some embodiments can include unreacted fuel and oxygen, exit first combustion chamber 10 via line 12 and passes through first heat exchanger HX1 at a predetermined flow rate such that the temperature of the exiting flue gas is maintained between 200 and 1600 degrees Celsius. The flue gas then enters second combustion chamber 20 via line 14, wherein additional fuel is combusted to produce additional flue gas and heat. If there is not enough unreacted fuel or oxygen in line 14, then a fresh makeup stream of fuel 6 and/or oxidant 8 can be added to second combustion chamber 20. Similar to the behavior of first combustion chamber 10, the flue gas exits second combustion chamber 20 via line 22 and passes through second heat exchanger HX2 at a predetermined flow rate such that the temperature of the flue gas in line 24 is maintained between 200 and 1600 degrees Celsius.

The cooled flue gas then enters dry flue gas cleaning chamber 30 and is contacted with adsorbent 26 in order to remove the sulfur oxides from the flue gas. Adsorbent 26 is a solid and could be of any type that allows for removal of sulfur oxides from flue gases. Preferably, adsorbent 26 will be recoverable in order to reduce the production of by-products. In one embodiment, the particle size of adsorbent 26 can be between 50 and 500 microns. Exemplary adsorbents include MgO and CaO.

In one embodiment, dry flue gas cleaning chamber 30 is equipped with one or more injectors that allow for homogenous dispersion of the adsorbent within dry flue gas cleaning chamber 30. Recycled flue gas can be used to improve the dispersion of the adsorbent within dry flue gas cleaning chamber 30. Depending upon the temperature of the flue gas in line 24, the walls of dry flue gas cleaning chamber 30 may or may not be of the membrane type like first combustion chamber 10 and second combustion chamber 20. In embodiments in which the temperature of the flue gas in line 24 is between 800 and 1100 degrees Celsius, a reducing agent such as urea or ammonia can be injected into dry flue gas cleaning chamber 30 along with adsorbent 26 in order to remove the nitrogen oxide.

Flue gas and spent adsorbent travel to first precipitator 40 via line 32. In one embodiment, first precipitator 40 is a cyclone. First precipitator 40 separates the flue gases from the spent adsorbent. The cleaned flue gases can sometimes contain fine-adsorbent particles. In these situations, the cleaned flue gases are sent to second precipitator 50 via line 42 in order to remove the remaining adsorbent particles. Examples of second precipitator 50 can include an electrostatic precipitator type or fabric filter bag type. The removed adsorbent particles are evacuated through line 51 and sent with the adsorbent removed from first precipitator 40 via line 44 to adsorbent storage tank 60. The cleaned flue gases exit second precipitator 50 through line 52 and pass through one or several heat exchangers (HX3, HX4). Preferably, third heat exchanger HX3 is fed with saturated steam to produce super-heated steam that can be fed to first heat exchanger HX1 or second heat exchanger HX2. Fourth heat exchanger HX4 is preferably fed with liquid water in order to increase its temperature before being used in the walls of first combustion chamber 10 and/or second combustion chamber 20.

After passing through third heat exchanger HX3 and fourth heat exchanger HX4, the cleaned flue gas is split into two streams, with recycle stream 56 being used to help recycle regenerated adsorbent back to dry flue gas cleaning chamber 30. CO$_2$ recovery stream 58 can be sent to a carbon dioxide recovery unit for additional process, or alternatively released to the atmosphere.

The spent adsorbent travels from first precipitator 40 to adsorbent storage tank 60 via line 44. In a preferred embodiment, gases produced from other parts of the system, such as nitrogen or cleaned flue gas, may be used to transport the spent adsorbent throughout the system. From adsorbent storage tank 60, the spent adsorbent travels to adsorbent regenerator 70 via line 62, where the spent adsorbent is contacted with a regeneration gas 64. Adsorbent regenerator 70 can be any reactor that allows efficient contact of the spent adsorbent and the regeneration gas, such as fluidized bed, fixed bed, or moving bed reactor. Preferred regeneration gases include hydrogen, methane, ethane, propane, and combinations thereof. Any other light hydrocarbon that is operable to react with the adsorbent can also be used as a regeneration gas. Spent regeneration gas exits adsorbent regenerator 70 via line 74 and can be sent to a sulfur recovery unit (not shown). Regenerated adsorbent leaves adsorbent regenerator 70 and can be combined with recycle stream 56 en route to dry flue gas cleaning chamber 30.

In an alternate embodiment, a portion of the spent adsorbent can be recycled back to dry flue gas cleaning chamber 30 via line 61 before being sent to adsorbent regenerator 70. This allows the adsorbent to be used multiple times, which advantageously improves the desulfurization efficiency of the system.

In an alternate embodiment, third heat exchanger HX3 is not required since the adsorption of the sulfur oxides within dry flue gas cleaning chamber 30 occurs at a temperature that is not compatible with superheating steam after dry flue gas cleaning chamber 30. For example, in an embodiment in which the temperature within line 32 is at or less than the boiling point of water, third heat exchanger HX3 is not required.

Example 1

In this example, magnesium oxide (M$_g$O) is used as the dry adsorbent to remove the sulfur oxide from the produced flue gases. The system combusts an oil heavy residue having a composition (in mass basis) according to Table I.

TABLE I

| Fuel Composition in ppm | | | | |
|---|---|---|---|---|
| Carbon | Hydrogen | Sulphur | Nitrogen | Metals |
| 84 | 9 | 6 | 1 | 290e–6 |

The Low Heating Value (LHV), which represents the amount of energy contained in the fuel, is estimated at 38 MJ/kg. The system is designed to produce about 100 MW of superheated steam at 480° C. and 80 bar. The oxidizer composition is given in Table II in mass basis.

TABLE II

| Oxidizer Composition | | |
|---|---|---|
| Oxygen | Nitrogen | Argon |
| 95 | 3 | 2 |

Based on fuel composition and oxidizer composition, the flue gas composition exiting the combustion zone and prior to the dry flue gas cleaning chamber is given in Table III in mass basis.

TABLE III

| Flue Gas Composition | | | | | |
|---|---|---|---|---|---|
| CO$_2$ | H$_2$O | N$_2$ | O$_2$ | SO$_2$ | A$_r$ |
| 68.41 | 23.16 | 1.92 | 2.02 | 2.67 | 1.83 |

The temperature at the entry of the dry flue gas cleaning chamber was adjusted to 1000° C. in order to optimize the adsorption of sulphur oxides. The basic reaction for adsorption and regeneration of the adsorbent are:

Oxidation of SO$_2$:

$$SO_2 + 1/2 O_2 \Leftrightarrow SO_3$$

Adsorption of SO$_3$:

$$M_gO + SO_3 \Leftrightarrow M_gSO_4$$

Regeneration of the Used Adsorbent:

$$H_2 + M_gSO_4 \Leftrightarrow SO_2 + H_2O + M_gO$$

$$H_2S + M_gSO_4 \Leftrightarrow SO_2 + H_2O + M_gO + S$$

A catalyst can be used in order to increase the conversion of SO$_2$ in the oxidation reaction. This catalyst can be any materials that have the property of improving the oxidation of SO$_2$ to SO$_3$ for example a cerium oxide CeO. The regeneration gas is a mixture of hydrogen H$_2$ and hydrogen sulphur H$_2$S.

The molar ratio between magnesium and fuel sulphur (M$_g$/S) was adjusted according to the adsorbent residence time in the dry flue gas cleaning chamber. With an M$_g$/S ratio at nine and a residence time in the dry flue gas cleaning chamber of two seconds, a desulphurization ratio of 94% can be achieved. Table IV displays the composition of the resulting cleaned flue gas in mass basis.

TABLE IV

| Desulfurized Flue Gas Composition | | | | | |
|---|---|---|---|---|---|
| CO$_2$ | H$_2$O | N$_2$ | O$_2$ | SO$_2$ | A$_r$ |
| 70.17 | 23.76 | 1.97 | 2.07 | 0.16 | 1.87 |

Example 2

The same procedure was run for Example 2, with the exception that the oxygen levels of oxidant stream were increased to 100%. Table V and Table VI below provide a summary of the temperature, flow rates, and resulting composition data of various streams throughout the system.

TABLE V

Temperature, Flow Rate, and Composition Data of Various Streams

| Stream | 4 | 2 | 12 | 22 |
|---|---|---|---|---|
| Temperature (° C.) | 25 | 230 | 1344 | 1344 |
| Flow rate (kg/s) | 4.2 | 1.3 | 5.8 | 12 |
| Stream composition (wt %) | | | | |
| $CO_2$ | | | 71.22 | 72.57 |
| $H_2O$ | | | 23.90 | 22.46 |
| $SO_2$ | | | 2.77 | 2.83 |
| $O_2$ | 100 | | 0.12 | 2.14 |
| $N_2$ | | | | |
| Ar | | | | |
| $H_2S$ | | | | |
| $M_gO$ | | | | |
| $M_gSO_4$ | | | | |
| $CeO_2$ | | | | |
| Fuel | | 100 | | |

TABLE VI

Temperature, Flow Rate, and Composition Data for Additional Streams

| | Stream | | | | | | |
|---|---|---|---|---|---|---|---|
| | 26 | 32 | 58 | 61 | 64 | 74 | 72 |
| Temperature (° C.) | 20 | 695 | 180 | 695 | 1128 | 700 | 700 |
| Flow rate (kg/s) | 0.004 | 17.34 | 12 | 5.34 | 1.36 | 1.52 | 1.2 |
| Stream composition (wt %) | | | | | | | |
| $CO_2$ | 38.3 | 74.55 | 74.55 | 76.9 | 40.86 | 36.36 | |
| $H_2O$ | | 23.07 | 23.07 | | 13.3 | 14.31 | |
| $SO_2$ | | 0.17 | 0.17 | | 1.18 | 9.85 | |
| $O_2$ | 11.7 | 2.2 | 2.2 | | | | |
| $N_2$ | | | | | | | |
| Ar | | | | | | | |
| $H_2S$ | | | | | 15.12 | 10.03 | |
| $H_2$ | | | | | 0.38 | 0.27 | |
| $M_gO$ | 45 | 0.004 | | 48.5 | | | 69.84 |
| $M_gSO_4$ | | 0.004 | | 44.47 | | | 21.61 |
| $CeO_2$ | 5 | 0.001 | | 7.04 | | | 8.56 |
| S | | | | | 29.16 | 29.18 | |
| Fuel | | | | | | | |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

I claim:

1. A steam-generating oxy-boiler system comprising:

an oxidant delivery system for providing an oxidant enriched gas stream having an oxygen content of 75 to 100% by volume;

a first combustion chamber in fluid communication with the oxidant delivery system, wherein the first combustion chamber is operable to combust a portion of a fuel stream in the presence of the oxidant enriched gas stream to generate a first product stream comprised of flue gas and non-combusted fuel;

a first heat exchanger in fluid communication with the first combustion chamber, wherein the first heat exchanger is operable to remove heat from the first product stream such that the temperature of the first product stream is maintained within a desired range;

a second combustion chamber in fluid communication with the first heat exchanger, wherein the second combustion chamber is operable to combust a portion of the non-combusted fuel of the first product stream to produce a second product stream, wherein the second product stream has a greater amount of flue gas as compared to the first product stream, wherein the first combustion chamber further comprises water circulating within walls of the first combustion chamber for regulating the temperature within the first combustion chamber, wherein the second combustion chamber further comprises water circulating within walls of the second combustion chamber for regulating the temperature within the second combustion chamber;

a second heat exchanger in fluid communication with the second combustion chamber, wherein the second heat exchanger is operable to remove heat from the second product stream such that the temperature of the second product stream is maintained within a desired range;

a flue gas cleaning chamber in fluid communication with the second heat exchanger, the flue gas cleaning chamber having an amount of a solid adsorbent contained therein that is operable to remove, via a chemical reaction, at least a portion of $SO_x$ from the second product stream and an amount of a reducing agent contained therein that is operable to remove, via a chemical reaction, at least a portion of $NO_x$ from the second product stream to produce a third product stream, the third product stream comprising a desulfurized and denitrified flue gas and spent adsorbent, the desulfurized and denitrified flue gas having reduced amounts of $SO_x$ and $NO_x$ as compared to the flue gas within the second product stream, wherein the solid adsorbent and the reducing agent are independently fed into the flue gas cleaning chamber;

a precipitating unit in fluid communication with the flue gas cleaning chamber for removing the spent adsorbent from the desulfurized and denitrified flue gas to produce a spent adsorbent stream and a cleaned desulfurized and denitrified flue gas stream;

an adsorbent storage tank in fluid communication with the precipitating unit for receiving the spent adsorbent stream;

a discharge line in fluid communication with the precipitating unit for sending the cleaned desulfurized and denitrified flue gas stream to a $CO_2$ recovery unit or to the atmosphere;

a reducing gas feed line in fluid communication with the flue gas cleaning chamber for introducing reducing gas to the flue gas cleaning chamber;

a regeneration unit in fluid communication with the adsorbent storage tank, the reducing gas feed line, and the flue gas cleaning chamber, the regeneration unit operable to regenerate a portion of the spent adsorbent stream by contacting the spent adsorbent stream with the reducing gas to produce regenerated adsorbent and spent reducing gas, wherein the regenerated adsorbent is then recycled back to the flue gas cleaning chamber; and a sulfur discharge line in fluid communication with the regeneration unit, the sulfur discharge line operable to introduce the spent reducing gas to a sulfur recovery unit, a third heat exchanger in fluid communication with the precipitating unit and the discharge line, the third heat exchanger operable to transfer heat energy from the flue gas stream to a target fluid prior to sending the cleaned flue gas stream to the $CO_2$ recovery unit or to the atmosphere, wherein the target fluid is the water before circulating within the walls of the first combustion chamber and within the walls of the second combustion chamber;

wherein the walls comprise membrane tubes and welded fins connecting the membrane tubes.

2. The system of claim 1, wherein the solid adsorbent has particle sizes in the range of 50 to 500 microns.

3. The system of claim 1, wherein the solid adsorbent is selected from the group consisting of MgO, CaO, and combinations thereof.

4. The system of claim 1, wherein the precipitating unit comprises a first precipitator, the first precipitator operable to remove all of the spent adsorbent from the desulfurized and denitrified flue gas.

5. The system of claim 1, wherein the first heat exchanger is further operable to receive the target fluid from the third heat exchanger and exchange heat between the first product stream and the target fluid such that the temperature of the first product stream is maintained within a desired range.

* * * * *